US012662052B2

(12) United States Patent
Horiuchi et al.

(10) Patent No.: US 12,662,052 B2
(45) Date of Patent: Jun. 23, 2026

(54) DISPLAY CONTROL DEVICE FOR DISPLAYING COMBINED VEHICLE-MOUNTED CAMERA IMAGES WITH ALIGNED VEHICLE ICON

(71) Applicant: TOYOTA JIDOSHA KABUSHIKI KAISHA, Toyota (JP)

(72) Inventors: Sho Horiuchi, Toyota (JP); Yoji Ichikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/983,056

(22) Filed: Dec. 16, 2024

(65) Prior Publication Data

US 2025/0206229 A1     Jun. 26, 2025

(30) Foreign Application Priority Data

Dec. 25, 2023     (JP) ................................. 2023-217904

(51) Int. Cl.
  B60R 1/22          (2022.01)
  G06V 20/58        (2022.01)
(52) U.S. Cl.
  CPC ............... B60R 1/22 (2022.01); G06V 20/58 (2022.01); *B60R 2300/105* (2013.01); *B60R 2300/307* (2013.01); *B60R 2300/60* (2013.01)
(58) Field of Classification Search
  CPC ............... B60R 1/22; B60R 2300/105; B60R 2300/307; B60R 2300/60; B60R 1/27; G06V 20/58; B60K 35/81; B60K 35/28; B60K 2360/16; B60K 2360/176; B60K 2360/1876; H04N 5/265; H04N 7/181

USPC ................................. 348/148; 382/103, 104
See application file for complete search history.

(56) References Cited

U.S. PATENT DOCUMENTS

| | | | |
|---|---|---|---|
| 9,809,196 B1 * | 11/2017 | Penilla ................... | B60R 25/10 |
| 9,969,261 B2 | 5/2018 | Kodama | |
| 10,045,173 B1 | 8/2018 | Morimura et al. | |
| 10,106,157 B2 | 10/2018 | Sawada et al. | |
| 10,150,407 B2 | 12/2018 | Takahashi et al. | |
| 10,421,436 B2 * | 9/2019 | Gage ...................... | G06V 20/56 |
| 10,696,297 B2 | 6/2020 | Nguyen Van et al. | |
| 11,001,255 B2 | 5/2021 | Fukuman et al. | |
| 11,110,937 B2 | 9/2021 | Kinoshita et al. | |
| 11,146,759 B1 * | 10/2021 | Brune ...................... | H04R 1/08 |
| 11,186,295 B2 * | 11/2021 | Kahn ...................... | B60Q 5/005 |

(Continued)

FOREIGN PATENT DOCUMENTS

JP          2020145687 A       9/2020

*Primary Examiner* — Asmamaw G Tarko

(74) *Attorney, Agent, or Firm* — Hunton Andrews Kurth LLP

(57)          ABSTRACT

The display control device displays captured images around a host vehicle captured by a plurality of vehicle-mounted cameras on a display unit. The display control device includes an image combining unit configured to combine the captured images of the plurality of vehicle-mounted cameras to generate a combined image, and an icon combining unit configured to generate a composite image by combining a vehicle icon with the combined image. The icon combining unit generates the composite image so that the imaging direction of the vehicle-mounted cameras and the orientation of the vehicle icon in the combined image are aligned when viewed from the host vehicle.

12 Claims, 5 Drawing Sheets

(56)                    References Cited

U.S. PATENT DOCUMENTS

| | | | |
|---|---|---|---|
| 11,273,792 B2* | 3/2022 | Brown | B60R 25/34 |
| 11,539,913 B2* | 12/2022 | Takata | H04N 7/181 |
| 11,972,669 B2* | 4/2024 | Rogan | G08B 13/19663 |
| 2014/0300739 A1* | 10/2014 | Mimar | G06Q 30/0283 |
| | | | 348/148 |
| 2019/0001968 A1 | 1/2019 | Yorifuji et al. | |
| 2019/0344828 A1 | 11/2019 | Omori et al. | |
| 2019/0389488 A1 | 12/2019 | Yamada et al. | |
| 2020/0262394 A1* | 8/2020 | Dean | G01S 17/42 |
| 2021/0178968 A1* | 6/2021 | Yamanaka | B60K 35/10 |
| 2021/0197723 A1* | 7/2021 | Takahashi | B60R 1/002 |
| 2022/0126843 A1* | 4/2022 | Dean | G01S 17/931 |
| 2023/0081930 A1* | 3/2023 | Yokoyama | G06V 40/103 |
| | | | 382/103 |

* cited by examiner

DISPLAY CONTROL DEVICE FOR DISPLAYING COMBINED VEHICLE-MOUNTED CAMERA IMAGES WITH ALIGNED VEHICLE ICON

CROSS-REFERENCE TO RELATED APPLICATIONS

This application is based upon and claims the benefit of priority from Japanese Patent Application No. 2023-217904, filed on Dec. 25, 2023, the entire contents of which are incorporated herein by reference.

BACKGROUND

Field

The present disclosure relates to a display control device.

Description of the Related Art

For example, Japanese Unexamined Patent Application Publication No. 2020-145687 describes a drive recorder equipped with multiple vehicle-mounted cameras. This drive recorder displays captured images from multiple vehicle-mounted cameras side by side on a display unit. When one of the displayed captured images is selected by a user, the drive recorder enlarges and displays the selected captured image.

In the above drive recorder, the captured images from multiple vehicle-mounted cameras are merely displayed side by side on the display unit. Therefore, it was difficult for the user to intuitively grasp which direction of the vehicle the captured image from the vehicle-mounted camera corresponds to when selecting the captured image to be enlarged.

Therefore, the present disclosure describes a display control device that allows a user to easily grasp the positional relationship between the captured images from multiple vehicle-mounted cameras and the host vehicle when displaying captured images around the host vehicle on a display unit.

SUMMARY

According to one aspect of the present disclosure, there is provided a display control device configured to display captured images around a host vehicle captured by a plurality of vehicle-mounted cameras on a display unit, comprising: an image combining unit configured to combine the captured images of the plurality of vehicle-mounted cameras to generate a combined image around the host vehicle; an icon combining unit configured to generate a composite image by combining a vehicle icon indicating the host vehicle with the combined image generated by the image combining unit; a region specifying unit configured to specify a divided image region selected by a user among a plurality of divided image regions included in the composite image, the composite image is divided into the plurality of divided image regions corresponding to respective imaging areas of the plurality of the vehicle-mounted cameras; and a display control unit configured to display the composite image generated by the icon combining unit on the display unit, and to display the captured image of the vehicle-mounted camera corresponding to the specified divided image region on the display unit if the divided image region selected by the user is specified by the region specifying unit, and not to display the captured image of the vehicle-mounted camera other than the vehicle-mounted camera corresponding to the specified divided image region on the display unit, wherein the icon combining unit is configured to generate the composite image by combining the vehicle icon at a position of the host vehicle in the combined image so that an imaging direction of the vehicle-mounted camera and an orientation of the vehicle icon in the combined image are aligned when viewed from the host vehicle.

The display control device further comprises a suspiciousness degree calculation unit configured to calculate a suspiciousness degree of the recognized person based on the movement of the person recognized by the person tracking unit and a predetermined suspicious person action, wherein the display control unit is configured to switch the captured images of the vehicle-mounted cameras so that the person having the highest suspiciousness degree calculated by the suspiciousness degree calculation unit is displayed on the display unit according to the movement of the person if a plurality of persons recognized by the person tracking unit are present in the divided image region selected by the user.

According to one aspect of the present disclosure, when displaying captured images around the host vehicle captured by multiple vehicle-mounted cameras on the display unit, the user can easily grasp the positional relationship between the captured images from the multiple vehicle-mounted cameras and the host vehicle.

DETAILED DESCRIPTION

Figure 1:
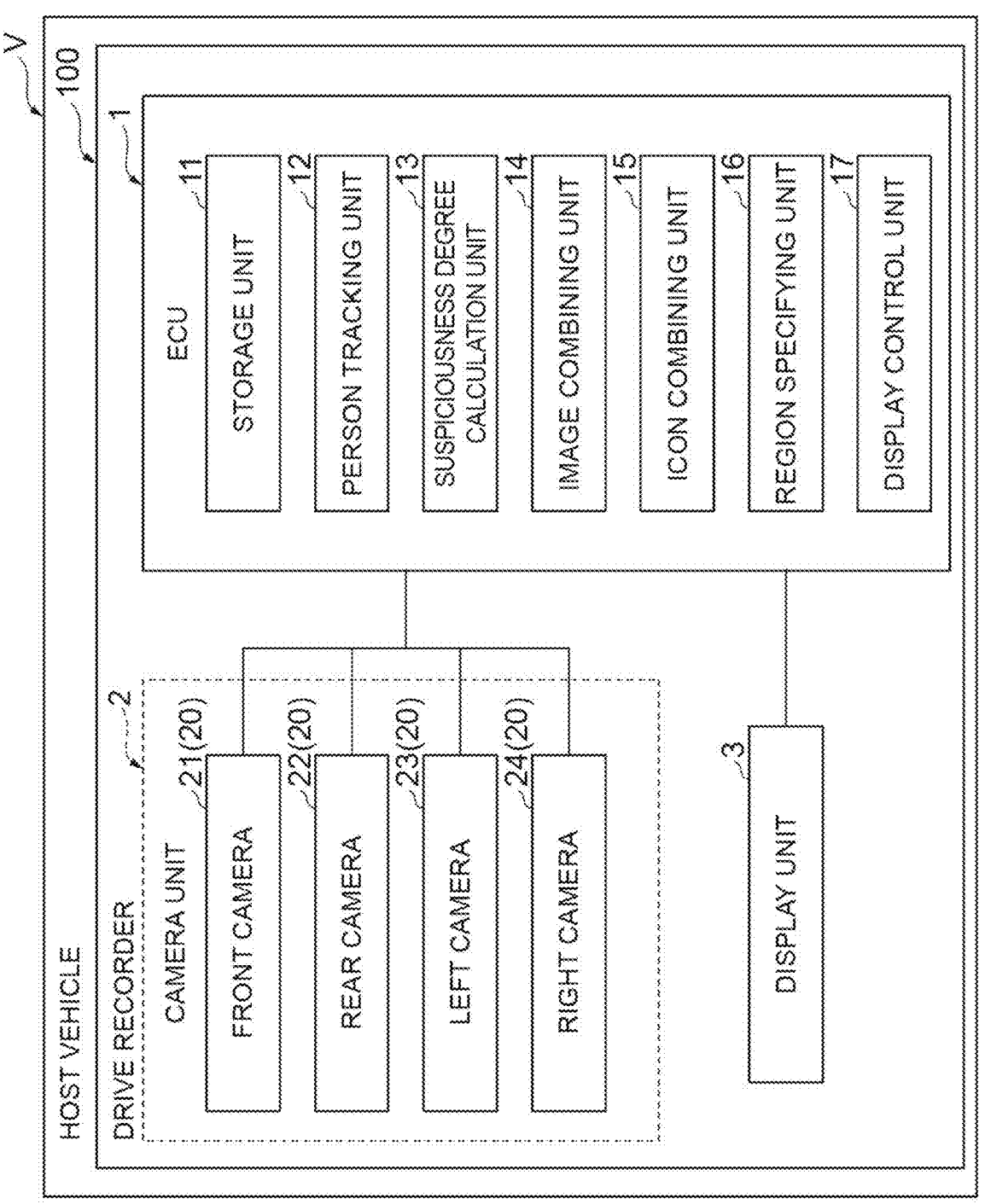
FIG. 1 is a block diagram showing an example of a drive recorder according to an embodiment.

Hereinafter, exemplary embodiments will be described with reference to the drawings. In the drawings, the same or equivalent elements are denoted by the same reference numerals, and redundant descriptions are omitted.

As shown in FIG. 1, a drive recorder 100 is mounted on a host vehicle V. The drive recorder 100 includes an ECU [Electronic Control Unit] 1, a camera unit 2, and a display unit 3. The drive recorder 100 displays captured images around the host vehicle V captured by a plurality of vehicle-mounted cameras 20 provided in the camera unit 2 on the display unit 3. The drive recorder 100 stores the captured images of the vehicle-mounted cameras 20 and displays the stored captured images based on instructions from the user.

The camera unit 2 includes a plurality of vehicle-mounted cameras 20. In the present embodiment, the camera unit 2 includes a front camera 21 that captures the front of the host vehicle V, a rear camera 22 that captures the rear of the host vehicle V, a left camera 23 that captures the left side of the host vehicle V, and a right camera 24 that captures the right side of the host vehicle V. The front camera 21, rear camera 22, left camera 23, and right camera 24 can capture the surroundings of the host vehicle V without interruption.

The display unit 3 displays the captured images (videos) captured by the camera unit 2. The display unit 3 may be a monitor mounted on the host vehicle V. The display unit 3 is not limited to being installed in the host vehicle V and may be a monitor of a mobile terminal such as a smartphone.

The ECU 1 functions as a display control device that displays captured images around the host vehicle V captured by a plurality of vehicle-mounted cameras 20 on the display unit 3. The ECU 1 is an electronic control unit having a CPU [Central Processing Unit], ROM [Read Only Memory], RAM [Random Access Memory], a communication module, and the like. The ECU 1 realizes various functions by loading a program recorded in the ROM into the RAM and executing the program loaded in the RAM by the CPU. The ECU 1 may be composed of a plurality of electronic units.

Functionally, the ECU 1 includes a storage unit 11, a person tracking unit 12, a suspiciousness degree calculation unit 13, an image combining unit 14, an icon combining unit 15, a region specifying unit 16, and a display control unit 17. The storage unit 11 stores captured images captured by the plurality of vehicle-mounted cameras 20 provided in the camera unit 2. The storage unit 11 sequentially stores the captured images along with time information when the captured images were captured. The captured images stored in the storage unit 11 are read out based on instructions from the user and displayed on the display unit 3.

The person tracking unit 12 recognizes a person in the captured images of the vehicle-mounted cameras 20. In other words, the person tracking unit 12 recognizes the presence of a person around the host vehicle V. The person tracking unit 12 can recognize a person in the captured images based on well-known image processing techniques. When the person tracking unit 12 recognizes a person in the captured images, it generates tracking information by tracking the movement of the person among the captured images of the plurality of vehicle-mounted cameras 20. The tracking information includes information indicating in which captured image of the vehicle-mounted cameras 20 the recognized person is included as the person moves. The person tracking unit 12 stores the generated tracking information in the storage unit 11.

The suspiciousness degree calculation unit 13 calculates a suspiciousness degree for the person recognized by the person tracking unit 12. The suspiciousness degree calculation unit 13 calculates the suspiciousness degree of the recognized person based on the movement of the recognized person and a predetermined suspicious person action. The suspiciousness degree calculation unit 13 may use AI (Artificial Intelligence) to calculate the suspiciousness degree. For example, the suspiciousness degree calculation unit 13 calculates a high suspiciousness degree when an action to steal the host vehicle V or an action to vandalize the host vehicle V is detected. The suspiciousness degree calculation unit 13 also calculates a high suspiciousness degree when a sign of an action to steal the host vehicle V or an action to vandalize the host vehicle V is detected. The suspicious person actions, such as actions to steal the host vehicle V or actions to vandalize the host vehicle V, are preset. The suspiciousness degree calculation unit 13 stores the calculated suspiciousness degree in the storage unit 11.

The image combining unit 14 combines the captured images of the plurality of vehicle-mounted cameras 20 to generate a combined image around the host vehicle V. The combined image is an image in which the surroundings of the host vehicle V are seamlessly combined using the captured images of the plurality of vehicle-mounted cameras 20. For example, when the imaging areas of two vehicle-mounted cameras 20 overlap, the image combining unit 14 generates the combined image using the captured image of either one of the vehicle-mounted cameras 20 for the overlapping area. The icon combining unit 15 generates a composite image by combining a vehicle icon indicating the host vehicle V with the combined image generated by the image combining unit 14.

Figure 2:
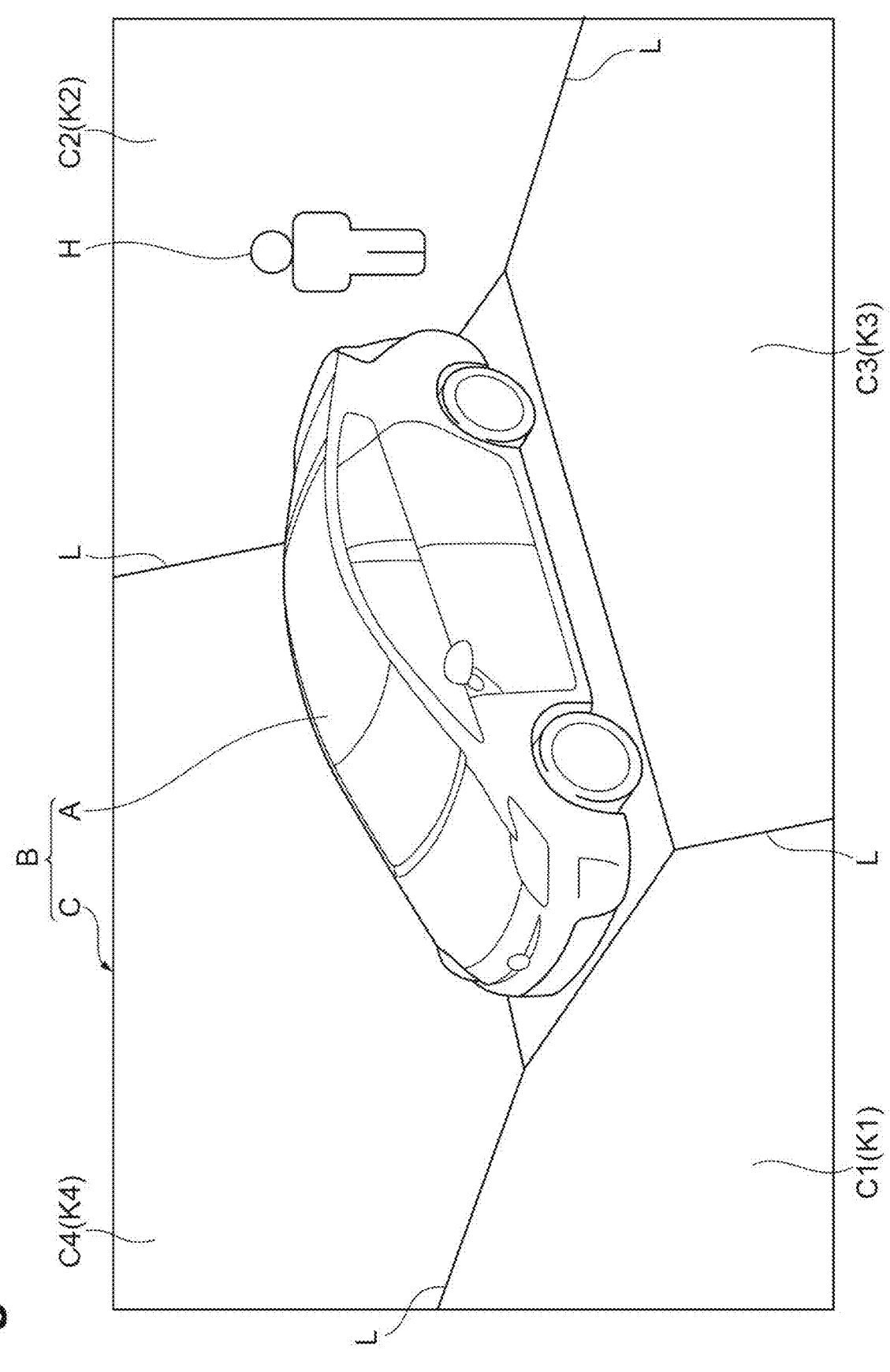
FIG. 2 is a diagram showing an example of a composite image.

An example of the images generated by the image combining unit 14 and the icon combining unit 15 will be described. As shown in FIG. 2, the image combining unit 14 combines the captured image C1 captured by the front camera 21, the captured image C2 captured by the rear camera 22, the captured image C3 captured by the left camera 23, and the captured image C4 captured by the right camera 24 to generate a combined image C around the host vehicle V. The icon combining unit 15 adds a vehicle icon A indicating the host vehicle V to the combined image C to generate a composite image B.

The icon combining unit 15 generates the composite image B by combining the vehicle icon A at the position of the host vehicle V in the combined image C so that the imaging direction of the vehicle-mounted cameras 20 and the orientation of the vehicle icon A in the combined image C are aligned when viewed from the host vehicle V. In other words, the icon combining unit 15 arranges the vehicle icon A so that the captured image C1 captured by the front camera 21 is positioned in front of the vehicle icon A when viewed from the vehicle icon A. The icon combining unit 15 arranges the vehicle icon A so that the captured image C2 captured by the rear camera 22 is positioned behind the vehicle icon A when viewed from the vehicle icon A. The icon combining unit 15 arranges the vehicle icon A so that the captured image C3 captured by the left camera 23 is positioned to the left of the vehicle icon A when viewed from the vehicle icon A. The icon combining unit 15 arranges the vehicle icon A so that the captured image C4 captured by the right camera 24 is positioned to the right of the vehicle icon A when viewed from the vehicle icon A.

The composite image generated by the icon combining unit 15 is divided into a plurality of divided image regions corresponding to the respective imaging areas of the plurality of vehicle-mounted cameras 20. For example, as shown in FIG. 2, the icon combining unit 15 divides the composite image B into a plurality of divided image regions using partition lines L that partition the imaging areas of the adjacent vehicle-mounted cameras 20. In the example shown in FIG. 2, the composite image B is divided into divided image regions K1, K2, K3, and K4 around the vehicle icon A. The divided image region K1 corresponds to the imaging area (captured image C1) of the front camera 21. The divided image region K2 corresponds to the imaging area (captured image C2) of the rear camera 22. The divided image region K3 corresponds to the imaging area (captured image C3) of the left camera 23. The divided image region K4 corresponds to the imaging area (captured image C4) of the right camera 24.

Thus, the user can grasp which vehicle-mounted camera 20 captured each region of the composite image B displayed on the display unit 3 by looking at the composite image B. The icon combining unit 15 is not limited to using the partition lines L and may divide the composite image B into the divided image regions K1 to K4 by differentiating the colors or the like of the respective divided image regions K1 to K4.

The region specifying unit 16 specifies the divided image region selected by the user among the plurality of divided image regions included in the composite image. Here, the user can select the divided image region (vehicle-mounted camera 20) to be enlarged and confirmed by looking at the composite image displayed on the display unit 3. For example, when the display unit 3 has a touch panel function, the user can select the divided image region by touching the display screen of the display unit 3. However, the method for selecting the divided image region by the user is not particularly limited. The region specifying unit 16 specifies the divided image region selected by the user to be enlarged and confirmed.

The display control unit 17 displays the composite image generated by the icon combining unit 15 on the display unit 3. The display control unit 17 displays the composite image on the display unit 3 based on instructions from the user. The display control unit 17 sequentially displays the composite image on the display unit 3 from the time instructed by the user. This allows the user to check the surroundings of the host vehicle V during the period they want to check.

As shown in FIG. 2, the display control unit 17 displays the combined image C and the vehicle icon A in the composite image B so that the image is viewed from an oblique upper position of the host vehicle V and its surroundings. Here, the display control unit 17 displays the combined image C and the vehicle icon A in the composite image B so that the side and top of the vehicle icon A are visible.

The user can change the viewing angle and viewpoint position of the composite image B displayed on the display unit 3. The display control unit 17 adjusts the orientation of the combined image C and the vehicle icon A in the composite image B so that the viewing angle and viewpoint position instructed by the user are achieved, and displays the adjusted composite image B on the display unit 3. For example, in the example shown in FIG. 2, the image is viewed from the left front oblique position of the host vehicle V. For example, based on instructions from the user, the display control unit 17 adjusts the orientation of the combined image C and the vehicle icon A in the composite image B so that the image is viewed from the right rear oblique position of the host vehicle V, and displays the adjusted composite image B on the display unit 3.

Figure 3:
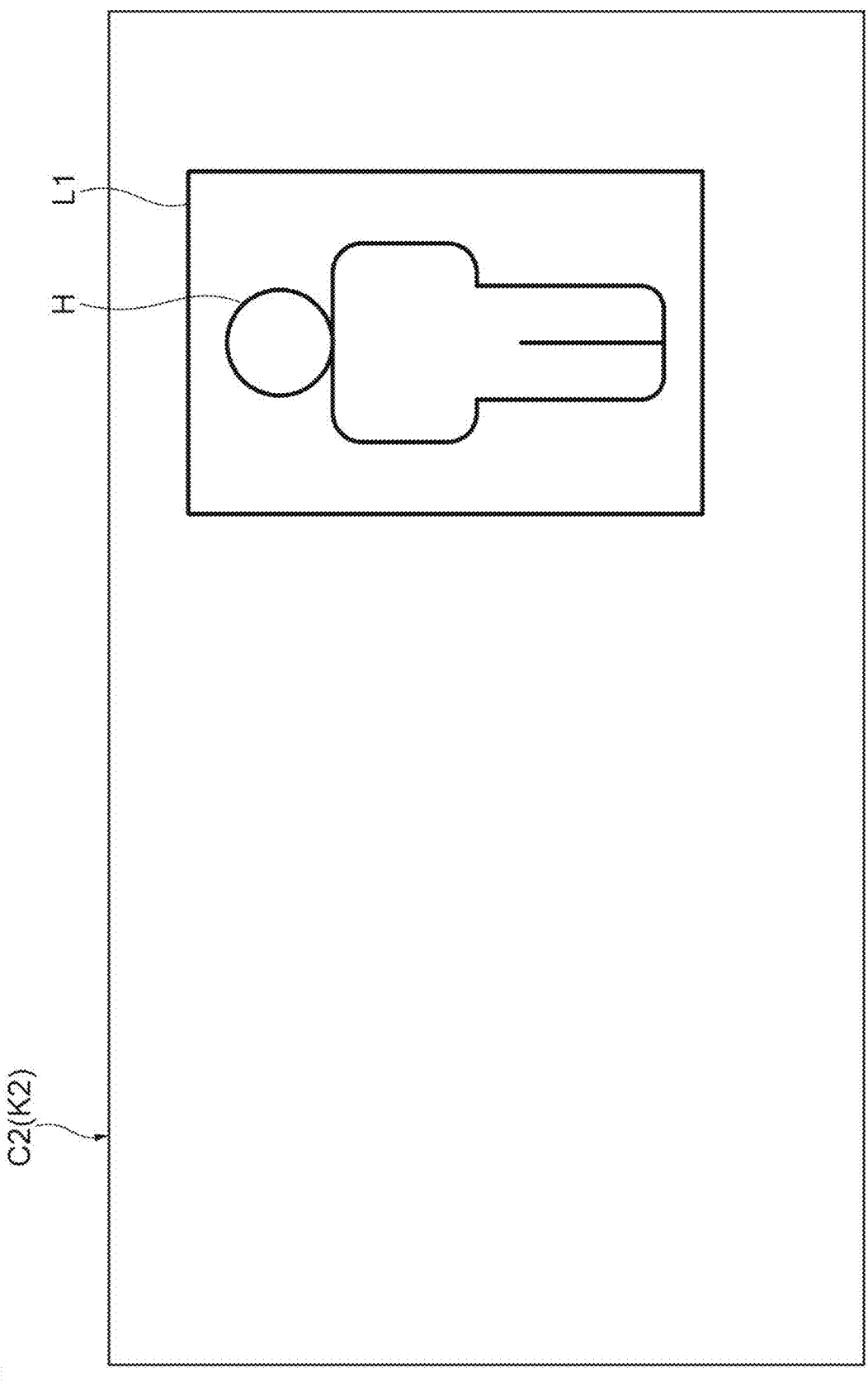
FIG. 3 is a diagram showing an example of a captured image of a vehicle-mounted camera corresponding to a divided image region selected by a user.

When the divided image region selected by the user is specified by the region specifying unit 16, the display control unit 17 displays the captured image of the vehicle-mounted camera 20 corresponding to the specified divided image region on the display unit 3. The display control unit 17 does not display the captured images of the vehicle-mounted cameras 20 other than the vehicle-mounted camera 20 corresponding to the specified divided image region on the display unit 3. In other words, the display control unit 17 displays only the captured image corresponding to the divided image region selected by the user to be enlarged and confirmed on the display unit 3. For example, in the state where the composite image B shown in FIG. 2 is displayed on the display unit 3, if the user selects the divided image region K2, the display control unit 17 displays only the captured image C2 of the rear camera 22 corresponding to the divided image region K2 on the display unit 3 as shown in FIG. 3.

Here, there may be a case where a person recognized by the person tracking unit 12 is present in the divided image region selected by the user. In this case, the display control unit 17 switches the captured images of the vehicle-mounted cameras 20 so that the person is displayed on the display unit 3 according to the movement of the person based on the tracking information generated by the person tracking unit 12. At this time, the display control unit 17 may display the recognized person in a manner that the user can identify.

For example, in the display example of the composite image B shown in FIG. 2, a person H is present behind the host vehicle V. The person tracking unit 12 recognizes the person H in the divided image region K2, which is the captured image C2 of the rear camera 22. The person tracking unit 12 generates tracking information indicating in which captured image of the vehicle-mounted cameras 20 the person H is included as the person H moves. In this situation, the user selects the divided image region K2 to be enlarged and confirmed. In this case, based on the user's selection, the display control unit 17 displays the captured image C2 of the rear camera 22 corresponding to the divided image region K2 on the display unit 3 as shown in FIG. 3. Then, based on the tracking information, the display control unit 17 switches the vehicle-mounted camera 20 to be displayed on the display unit 3 so that the person H is displayed on the display unit 3 even if the person H moves. For example, the display control unit 17 may display the person H surrounded by a frame line L1 on the display unit 3 so that the user can identify the person H recognized by the person tracking unit 12. However, the method for displaying the recognized person H in a manner that the user can identify is not particularly limited. For example, the display control unit 17 may make the person H blink or change the color.

There may be a case where a plurality of persons recognized by the person tracking unit 12 are present in the divided image region selected by the user. In this case, the display control unit 17 switches the captured images of the vehicle-mounted cameras 20 so that the person closest to the host vehicle V is displayed on the display unit 3 according to the movement of the person.

When a plurality of persons recognized by the person tracking unit 12 are present in the divided image region selected by the user, the display control unit 17 may switch the captured images of the vehicle-mounted cameras 20 based on the suspiciousness degree calculated by the suspiciousness degree calculation unit 13. In this case, the display control unit 17 switches the captured images of the vehicle-mounted cameras 20 so that the person having the highest suspiciousness degree calculated by the suspiciousness degree calculation unit 13 is displayed on the display unit 3 according to the movement of the person.

Figure 4:
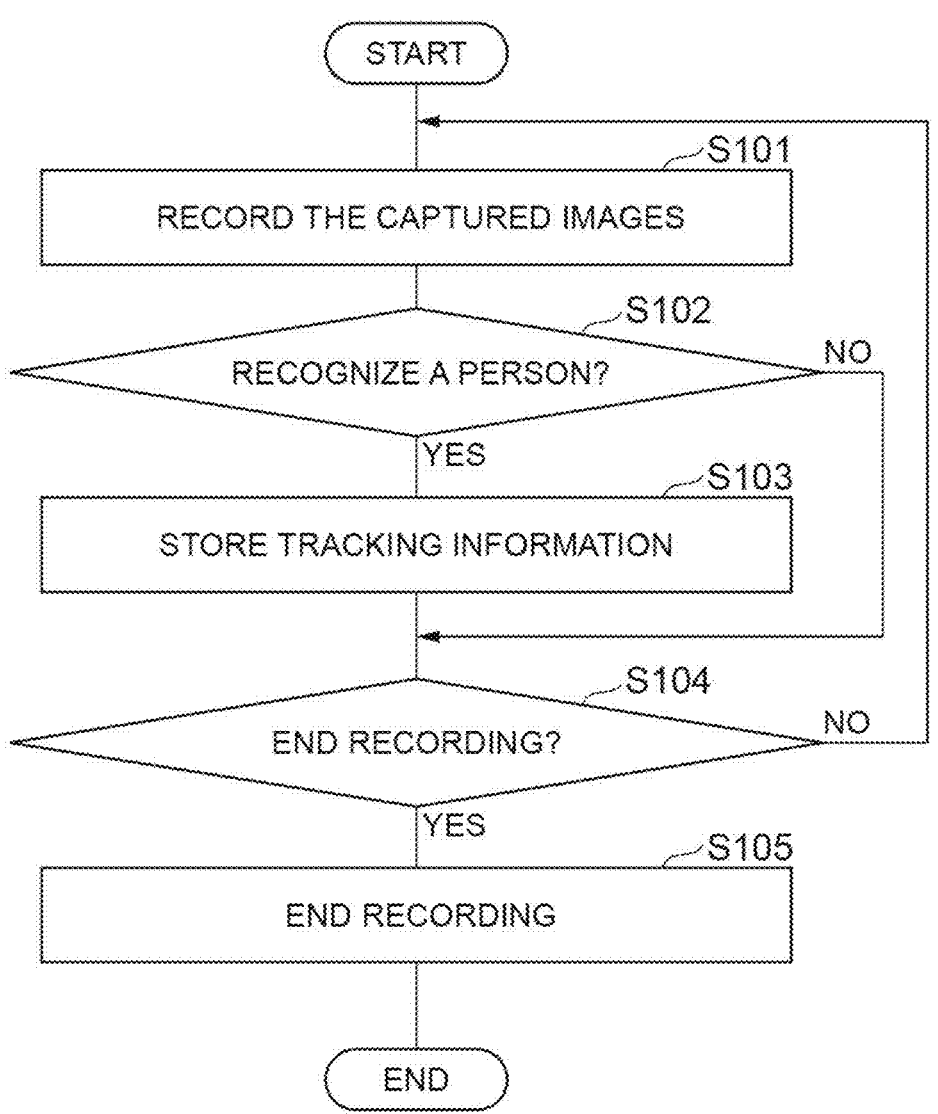
FIG. 4 is a flowchart showing the flow of processing for recording captured images of vehicle-mounted cameras.

Next, the flow of processing for recording captured images of the vehicle-mounted cameras 20 performed in the drive recorder 100 will be described with reference to the flowchart shown in FIG. 4. Here, the case where the drive recorder 100 records the surroundings of the host vehicle V when the host vehicle V is parked will be described. As an example, the processing shown in FIG. 4 starts when the host vehicle V is parked. As shown in FIG. 4, when the host vehicle V is parked, the storage unit 11 stores the captured images of the respective vehicle-mounted cameras 20 (S101). The person tracking unit 12 performs processing to recognize a person in the captured images of the vehicle-mounted cameras 20. If a person is recognized (S102: YES), the person tracking unit 12 generates tracking information by tracking the movement of the person among the captured images of the plurality of vehicle-mounted cameras 20. The person tracking unit 12 stores the generated tracking information in the storage unit 11 (S103).

If no person is recognized (S102: NO) or after the tracking information is generated in S103, the storage unit 11 determines whether to end the storage (recording) of the captured images. For example, the storage unit 11 determines to end the storage of the captured images when the host vehicle V starts moving from the parked state. If it is determined to end the storage of the captured images (S104: YES), the storage unit 11 ends the storage (recording) of the captured images (S105). If it is not determined to end the storage of the captured images (S104: NO), the drive recorder 100 performs the processing from S101 again.

Figure 5:
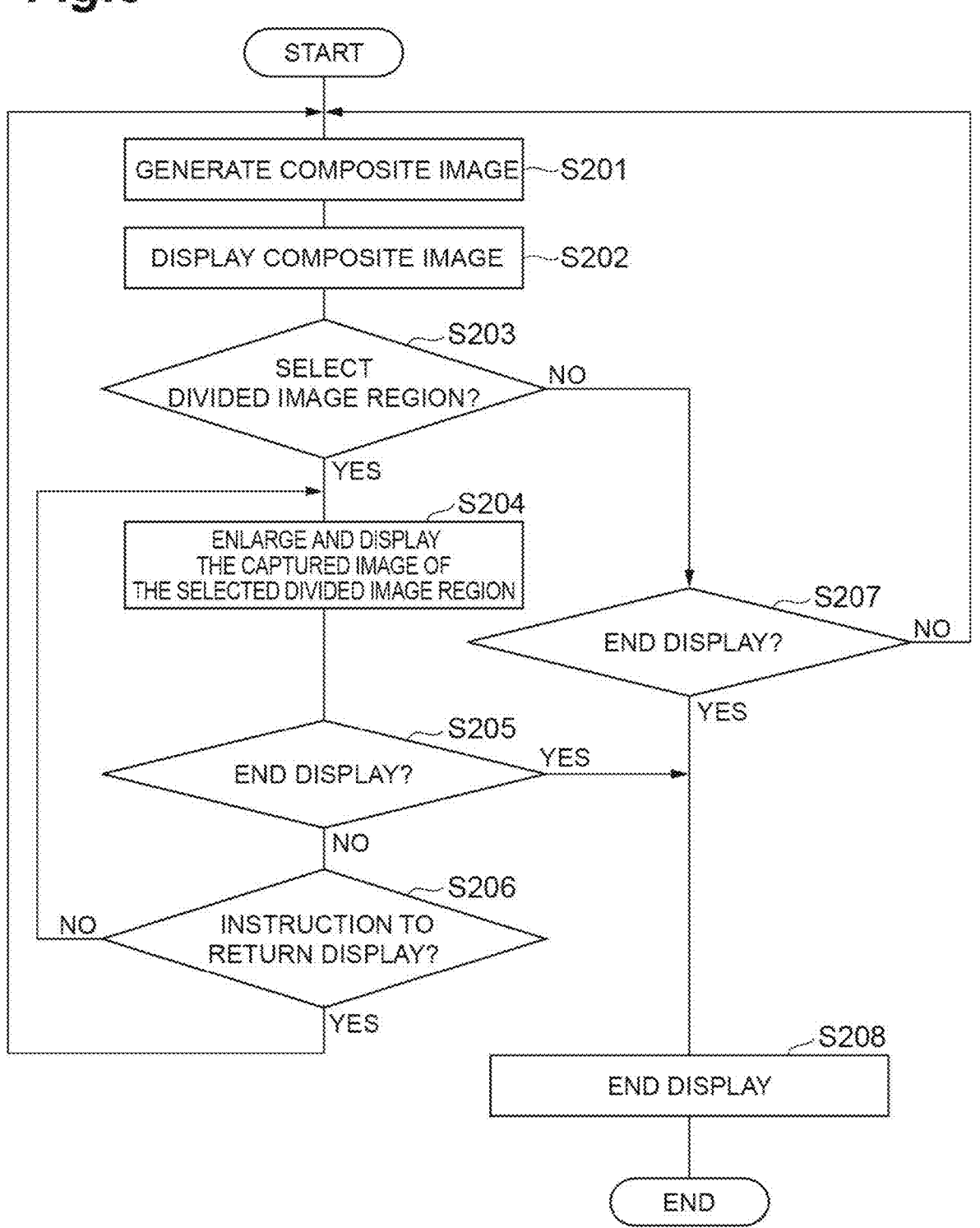
FIG. 5 is a flowchart showing the flow of processing for displaying captured images of vehicle-mounted cameras.

Next, the flow of processing for displaying captured images performed in the drive recorder 100 will be described with reference to the flowchart shown in FIG. 5. Here, the case where the user checks the surroundings of the host vehicle V after parking will be described as an example. The processing shown in FIG. 5 starts based on an instruction from the user to display the captured images. As shown in FIG. 5, when the instruction to display is given by the user, the image combining unit 14 combines the captured images of the plurality of vehicle-mounted cameras 20 to generate a combined image around the host vehicle V. Then, the icon combining unit 15 combines the vehicle icon with the generated captured image to generate a composite image (S201).

The display control unit 17 displays the generated composite image on the display unit 3 (S202). The display control unit 17 determines whether the divided image region selected by the user is specified by the region specifying unit 16 (S203). In other words, the display control unit 17 determines whether the divided image region to be enlarged and displayed is selected by the user. If the divided image region selected by the user is specified by the region specifying unit 16 (S203: YES), the display control unit 17 displays only the captured image of the one vehicle-mounted camera 20 corresponding to the divided image region selected by the user on the display unit 3 (S204). The display control unit 17 determines whether to end the display of the captured images of the vehicle-mounted cameras 20 (S205). For example, the display control unit 17 can determine to end the display when an instruction to end the display is input by the user.

If it is determined not to end the display (S205: NO), the display control unit 17 determines whether an instruction to return the display to the original state is given by the user (S206). The instruction to return the display to the original state is an instruction to return from the state of displaying only the captured image of one vehicle-mounted camera 20 to the state of displaying the composite image showing the entire surroundings of the host vehicle V. The user can give this instruction to return the display, for example, by pressing a "Back" button or the like. If the instruction to return the display to the original state is not given by the user (S206: NO), the display control unit 17 performs the processing in S204.

If a person is recognized by the person tracking unit 12 in the divided image region selected by the user, the display control unit 17 switches the captured images of the vehicle-mounted cameras 20 so that the person is displayed on the display unit 3 according to the movement of the person based on the tracking information generated by the person tracking unit 12 in S204. If a plurality of persons are recognized in the divided image region selected by the user, the display control unit 17 switches the captured images of the vehicle-mounted cameras 20 so that the person closest to the host vehicle V is displayed on the display unit 3 according to the movement of the person. Alternatively, the display control unit 17 switches the captured images of the vehicle-mounted cameras 20 so that the person having the highest suspiciousness degree calculated by the suspiciousness degree calculation unit 13 is displayed on the display unit 3 according to the movement of the person.

If the instruction to return the display to the original state is given by the user (S206: YES), the drive recorder 100 performs the processing from S201 again. If it is not determined that the divided image region is selected in S203 (S203: NO), the display control unit 17 determines whether to end the display of the captured images of the vehicle-mounted cameras 20 (S207). If it is not determined to end the display of the captured images (S207: NO), the drive recorder 100 performs the processing from S201 again. If it is determined to end the display of the captured images in S205 or S207 (S205, S207: YES), the display control unit 17 ends the display of the captured images (S208).

As described above, the image combining unit 14 generates a combined image by combining the captured images of the plurality of vehicle-mounted cameras 20. The icon combining unit 15 generates a composite image by combining the vehicle icon with the generated combined image. At this time, the icon combining unit 15 combines the vehicle icon at the position of the host vehicle V in the combined image so that the imaging direction of the vehicle-mounted cameras 20 and the orientation of the vehicle icon in the combined image are aligned when viewed from the host vehicle V. The display control unit 17 displays the generated composite image on the display unit 3. When the divided image region is selected by the user, the display control unit 17 displays the captured image of the vehicle-mounted camera 20 corresponding to the selected divided image region on the display unit 3. This allows the user to easily grasp which area of the host vehicle V the captured images of the combined plurality of vehicle-mounted cameras 20 correspond to, using the orientation of the vehicle icon in the composite image displayed on the display unit 3 as a reference. Therefore, in the drive recorder 100, when displaying the captured images around the host vehicle V captured by the plurality of vehicle-mounted cameras 20 on the display unit 3, the user can easily grasp the positional relationship between the captured images from the plurality of vehicle-mounted cameras 20 and the host vehicle V.

The display control unit 17 displays the combined image and the vehicle icon in the composite image so that the image is viewed from an oblique upper position of the host vehicle V and its surroundings. In other words, the display unit 3 displays the composite image viewed from an oblique upper position of the host vehicle V. This allows the user to more easily grasp the surroundings (positional relationship, etc.) of the host vehicle V.

If a person is recognized by the person tracking unit 12 in the divided image region selected by the user, the display control unit 17 switches the captured images of the vehicle-mounted cameras 20 so that the person is displayed on the display unit 3 according to the movement of the person based on the tracking information generated by the person tracking unit 12. This eliminates the need for the user to switch the captured images of the vehicle-mounted cameras 20 displayed on the display unit 3 according to the movement of the person. Therefore, the user can easily check the surroundings of the host vehicle V.

If a plurality of persons are recognized by the person tracking unit 12 in the divided image region selected by the user, the display control unit 17 switches the captured images of the vehicle-mounted cameras 20 so that the person closest to the host vehicle V is displayed on the display unit 3 according to the movement of the person. For example, when multiple persons are present around the host vehicle V, the person closer to the host vehicle V is more likely to perform vandalism or the like on the host vehicle V than the person farther from the host vehicle V. Therefore, the display control unit 17 switches the captured images of the vehicle-mounted cameras 20 so that the person closest to the host vehicle V is displayed. This allows the user to easily check the person who needs to be checked the most when multiple persons are present around the host vehicle V.

If a plurality of persons are recognized by the person tracking unit 12 in the divided image region selected by the user, the display control unit 17 switches the captured images of the vehicle-mounted cameras 20 so that the person having the highest suspiciousness degree calculated by the suspiciousness degree calculation unit 13 is displayed on the display unit 3 according to the movement of the person. For example, when multiple persons are present around the host vehicle V, the person performing suspicious actions is more likely to perform vandalism or the like on the host vehicle V than the person not performing suspicious actions. Therefore, the display control unit 17 switches the captured images of the vehicle-mounted cameras 20 so that the person having the highest suspiciousness degree is displayed. This allows the user to easily check the person who needs to be checked the most when multiple persons are present around the host vehicle V.

Although the embodiment of the present disclosure has been described above, the present disclosure is not limited to the above embodiment. For example, in the above embodiment, the case where the user checks the captured images stored in the storage unit 11 later was described as an example. The present disclosure is not limited to this, and the drive recorder 100 may generate the composite image in real-time and display it on the display unit 3.

The installation position, number, and type of the vehicle-mounted cameras 20 are not particularly limited. For example, the vehicle-mounted cameras 20 may be 360° cameras (omnidirectional cameras) capable of capturing 360° around. Four 360° cameras may be provided, each capturing the front, rear, left, and right of the host vehicle V. In this case, the drive recorder 100 can enlarge and display only the necessary parts from the captured images with a wide angle of view.

At least some of the embodiments and various modifications described above may be combined arbitrarily.

It is to be understood that not all aspects, advantages and features described herein may necessarily be achieved by, or included in, any one particular example. Indeed, having described and illustrated various examples herein, it should be apparent that other examples may be modified in arrangement and detail.

What is claimed is:

1. A display control device configured to display captured images around a host vehicle captured by a plurality of vehicle-mounted cameras on a display unit, comprising:

an image combining unit configured to combine the captured images of the plurality of the vehicle-mounted cameras to generate a combined image around the host vehicle;

an icon combining unit configured to generate a composite image by combining a vehicle icon indicating the host vehicle with the combined image generated by the image combining unit;

a region specifying unit configured to specify a divided image region selected by a user among a plurality of divided image regions included in the composite image, the composite image is divided into the plurality of divided image regions corresponding to respective imaging areas of the plurality of the vehicle-mounted cameras;

a display control unit configured to display the composite image generated by the icon combining unit on the display unit, and to display the captured image of the vehicle-mounted camera corresponding to the specified divided image region on the display unit if the divided image region selected by the user is specified by the region specifying unit, and not to display the captured image of the vehicle-mounted camera other than the vehicle-mounted camera corresponding to the specified divided image region on the display unit;

a person tracking unit configured to recognize a person in the captured image and generate tracking information by tracking a movement of the person among the captured images of the plurality of the vehicle-mounted cameras; and a suspiciousness degree calculation unit configured to calculate a suspiciousness degree of the recognized person based on the movement of the person recognized by the person tracking unit and a predetermined suspicious person action, wherein the icon combining unit is configured to generate the composite image by combining the vehicle icon at a position of the host vehicle in the combined image so that an imaging direction of the vehicle-mounted camera and an orientation of the vehicle icon in the combined image are aligned when viewed from the host vehicle, wherein the display control unit is configured to switch the captured images of the vehicle-mounted cameras so that the person recognized by the person tracking unit is displayed on the display unit according to the movement of the person based on the tracking information if the person recognized by the person tracking unit is present in the divided image region selected by the user, and wherein the display control unit is configured to switch the captured images of the vehicle-mounted cameras so that the person having the highest suspiciousness degree calculated by the suspiciousness degree calculation unit is displayed on the display unit according to the movement of the person if a plurality of persons recognized by the person tracking unit are present in the divided image region selected by the user.

2. The display control device according to claim 1,
wherein the display control unit is configured to display the combined image and the vehicle icon in the composite image so that the image is viewed from an oblique upper position of the host vehicle and its surroundings.

3. The display control device according to claim 2, wherein the display control unit is configured to adjust an orientation of the combined image and the vehicle icon in the composite image based on a viewing angle and viewpoint position instructed by the user.

4. The display control device according to claim 1, wherein the suspiciousness degree calculation unit is configured to use artificial intelligence to calculate the suspiciousness degree.

5. The display control device according to claim 1, wherein the suspiciousness degree calculation unit is configured to calculate a high suspiciousness degree when an action to steal the host vehicle or an action to vandalize the host vehicle is detected.

6. The display control device according to claim 1, wherein the suspiciousness degree calculation unit is configured to calculate a high suspiciousness degree when a sign of an action to steal the host vehicle or an action to vandalize the host vehicle is detected.

7. The display control device according to claim 1, wherein the predetermined suspicious person action includes actions to steal the host vehicle or actions to vandalize the host vehicle.

8. The display control device according to claim 1, further comprising a storage unit, wherein the suspiciousness degree calculation unit is configured to store the calculated suspiciousness degree in the storage unit.

9. The display control device according to claim 1, further comprising a storage unit configured to store the captured images captured by the plurality of vehicle-mounted cameras along with time information when the captured images were captured.

10. The display control device according to claim 1, wherein the tracking information includes information indicating in which captured image of the vehicle-mounted cameras the recognized person is included as the person moves.

11. The display control device according to claim 1, wherein the icon combining unit divides the composite image into the plurality of divided image regions using partition lines that partition the imaging areas of adjacent vehicle-mounted cameras.

12. The display control device according to claim 1, wherein the display unit has a touch panel function, and the user selects the divided image region by touching a display screen of the display unit.

\* \* \* \* \*